United States Patent
Bhanu et al.

(10) Patent No.: US 9,239,955 B2
(45) Date of Patent: Jan. 19, 2016

(54) METHOD AND SYSTEM FOR VEHICLE CLASSIFICATION

(75) Inventors: Bir Bhanu, Riverside, CA (US); Ninad Thakoor, Riverside, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 299 days.

(21) Appl. No.: 14/005,102

(22) PCT Filed: Mar. 14, 2012

(86) PCT No.: PCT/US2012/029012
§ 371 (c)(1),
(2), (4) Date: Oct. 17, 2013

(87) PCT Pub. No.: WO2012/125687
PCT Pub. Date: Sep. 20, 2012

(65) Prior Publication Data
US 2014/0037142 A1    Feb. 6, 2014

Related U.S. Application Data

(60) Provisional application No. 61/452,345, filed on Mar. 14, 2011, provisional application No. 61/452,392, filed on Mar. 14, 2011, provisional application No. 61/452,480, filed on Mar. 14, 2011.

(51) Int. Cl.
*G06K 9/00* (2006.01)
*G08G 1/015* (2006.01)
(Continued)

(52) U.S. Cl.
CPC ........ *G06K 9/00536* (2013.01); *G06K 9/00785* (2013.01); *G06K 9/03* (2013.01); *G06K 9/6857* (2013.01); *G08G 1/015* (2013.01); *G08G 1/04* (2013.01)

(58) Field of Classification Search
None
See application file for complete search history.

(56) References Cited

U.S. PATENT DOCUMENTS

| | | | |
|---|---|---|---|
| 5,809,161 A | | 9/1998 | Auty et al. |
| 5,886,648 A | * | 3/1999 | McElroy ............... B60S 3/04 134/123 |

(Continued)

FOREIGN PATENT DOCUMENTS

| | | |
|---|---|---|
| CN | 1144328 A | 3/1997 |
| CN | 101320520 A | 12/2008 |

(Continued)

OTHER PUBLICATIONS

Lai et al. (Lai et al., "Vehicle Type Classification from Visual-Based Dimension Estimation" 2001 IEEE Intelligent Transportation Systems Conference Proceedings, Oakland CA USA Aug. 25-29 2001, pp. 201-206, Digital Object Identifier: 10.1109/ITSC.2001.948656), hereby referred to as "Lai".*

(Continued)

*Primary Examiner* — Tahmina Ansari
(74) *Attorney, Agent, or Firm* — Buchanan Ingersoll & Rooney PC

(57) ABSTRACT

A method and system of vehicle classification, and more particularly to a method and system called hierarchical vehicle classification system using a video and/or video image, a method and system of vehicle classification using a vehicle ground clearance measurement system, and method and system for classification of passenger vehicles and measuring their properties, and more particularly to capturing a vehicle traveling along a road from a single camera and classifying the vehicle into a vehicle class.

19 Claims, 14 Drawing Sheets

(51) Int. Cl.
G08G 1/04 (2006.01)
G06K 9/03 (2006.01)
G06K 9/68 (2006.01)

(56) References Cited

U.S. PATENT DOCUMENTS

| | | | |
|---|---|---|---|
| 5,910,817 | A | 6/1999 | Ohashi et al. |
| 6,714,665 | B1* | 3/2004 | Hanna ..................... G06K 9/00 382/106 |
| 6,965,438 | B2 | 11/2005 | Lee et al. |
| 7,446,798 | B2 | 11/2008 | Comaniciu et al. |
| 8,204,277 | B2* | 6/2012 | Zhang ................ G06K 9/00798 382/104 |
| 8,229,171 | B2* | 7/2012 | Takahashi .......... G06K 9/00771 382/104 |
| 2003/0042303 | A1* | 3/2003 | Tsikos ................ G06K 7/10594 235/384 |
| 2003/0189500 | A1 | 10/2003 | Lim |
| 2005/0267657 | A1* | 12/2005 | Devdhar ............ G06K 9/00208 701/33.4 |
| 2008/0273752 | A1* | 11/2008 | Zhu ....................... B06W 40/02 382/103 |

FOREIGN PATENT DOCUMENTS

| | | |
|---|---|---|
| EP | 0 631683 | 8/2001 |
| KR | 10-0459478 B1 | 12/2004 |
| WO | WO 99/35630 A1 | 7/1999 |
| WO | WO 2004/072901 A1 | 8/2004 |

OTHER PUBLICATIONS

Kafai, M.; Bhanu, B., "Dynamic Bayesian Networks for Vehicle Classification in Video," in Industrial Informatics, IEEE Transactions on , vol. 8, No. 1, pp. 100-109, Feb. 2012 doi: 10.1109/TII.2011. 2173203.*

Thakoor, N.S.; Bhanu, B., "Structural Signatures for Passenger Vehicle Classification in Video," in Intelligent Transportation Systems, IEEE Transactions on , vol. 14, No. 4, pp. 1796-1805, Dec. 2013 doi: 10.1109/TITS.2013.2269137.*

Hsieh et al., "Automatic Traffic Surveillance System for Vehicle Tracking and Classification", IEEE Transactions on Intelligent Transportation Systems, vol. 7, No. 2, Jun. 2006, pp. 175-187.

Bucher, "Measurement of Distance and Height in Images baed on easy attainable Calibration Parameters", Proceedings of the IEEE IntelligentVehicles Symposium 2000, Dearborn, MI, USA, Oct. 3-5, 2000, pp. 314-319.

Broggi et al., "Multi-Resolution Vehicle Detection using Artificial Vision", 2004 IEEE Vehicles Symposium, University of Parma, Parma, Italy, Jun. 14-17, 2004, pp. 310-314.

Extended European Search Report issued Feb. 5, 2015 by the European Patent Office in corresponding European Application 12758103.1.

First Office Action issued Jan. 26, 2015 by the Chinese Patent Office in corresponding Chinese Application No. 201280023237.0, and an English translation thereof.

Lu et al., "Vehicle Geometric Parameters Extraction and Vehicle-type Classification Based on Video", Computer Engineering, vol. 35, No. 20, Oct. 2009, pp. 173-175.

Daiji et al., "Development of Transportation Vehicle Classification Detection Device," Highways in Foreign Countries, May 1982, pp. 49-55.

International Search Report (PCT/ISA/210) mailed on Oct. 23, 2012, by the US Patent Office as the International Searching Authority for International Application No. PCT/US2012/029012.

* cited by examiner

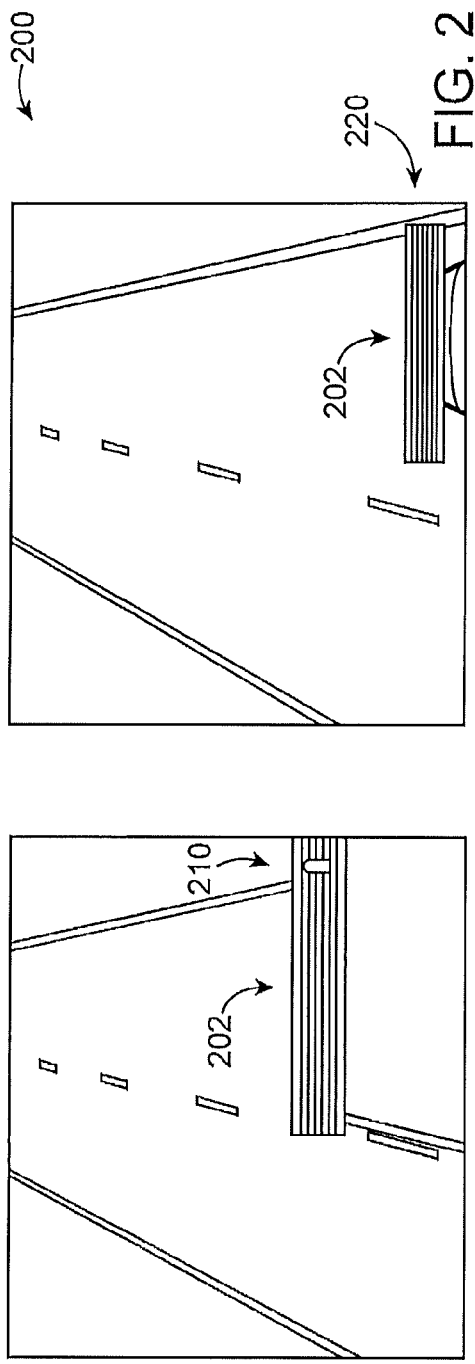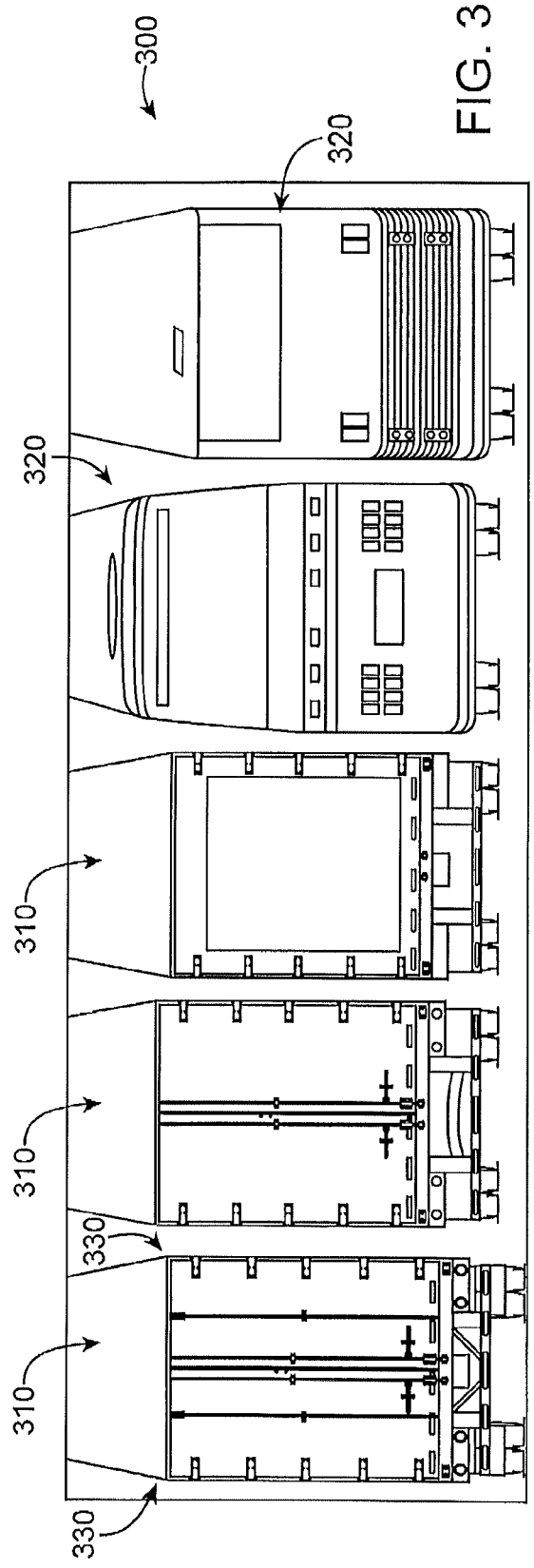

METHOD AND SYSTEM FOR VEHICLE CLASSIFICATION

FIELD OF THE INVENTION

The present invention to a method and system of vehicle classification, and more particularly to a method and system called hierarchical vehicle classification system using a video and/or video image, a method and system of vehicle classification using a vehicle ground clearance measurement system, and method and system for classification of passenger vehicles and measuring their properties, and more particularly to capturing a vehicle traveling along a road from a single camera and classifying the vehicle into one of the 3 classes: Sedan, Pickup, and/or Minivan and SUV (Sports Utility Vehicle).

BACKGROUND OF THE INVENTION

A vehicle is typically classified into one of the six (6) classes: sedans, pickups, minivans, SUVs (Sports Utility Vehicles), buses and trucks. Currently, it is believed that no such system exists for classifying on-road civilian vehicles. State of the art video based vehicle classifiers classify the vehicles based on their size alone. Consequently, these systems fail in fine grain classification of various passenger and commercial vehicles.

Academic research has been done for side views of the vehicle; however, prior work for classifying vehicle from rear view video does not exist. A typical system has a camera pointed at a road lane such that the horizontal scan lines of the camera are parallel to the horizon. Accordingly, it would be desirable to have a software system for hierarchical classification of vehicles from a video of the rear view and/or back end of the vehicle.

In addition, current methods and systems of passenger vehicle classification rely on side views of the vehicles. Generally, the side profile of the vehicle is the key information used to accurately classify the vehicles. However, on a multi-lane road, the side profiles can be easily occluded by other vehicles. Additionally, most of the cameras deployed along the highways and other road capture rear views of the vehicle making the side profile based techniques useless. Thus, there is a need for a system and method that classifies passenger vehicles based on a camera image of the back end or rear of the vehicle.

SUMMARY

In accordance with an exemplary embodiment, a method for hierarchical classification of vehicles comprises: locating a moving object using a moving object detection system; determining if the moving object is a small vehicle or a large vehicle based on a width of the moving object relative to a width of a roadway lane; and assigning the moving object to classifiers for refined classification.

In accordance with a further exemplary embodiment, a system for classification of vehicles comprises: a camera for capturing images of at least one moving object; and a computer processing unit, which performs the following steps: locating a moving object using a moving object detection system; determining if the moving object is a small vehicle or a large vehicle based on a width of the moving object relative to a width of a roadway lane; and assigning the moving object to classifiers for refined classification.

In accordance with a further exemplary embodiment, a computer program product comprising a non-transitory computer usable medium having a computer readable code embodied therein for classification of passenger vehicles and measuring their properties from a rear view video frame, the computer readable program code is configured to execute a process, which includes the steps of: locating a moving object using a moving object detection system; determining if the moving object is a small vehicle or a large vehicle based on a width of the moving object relative to a width of a roadway lane; and assigning the moving object to classifiers for refined classification.

In accordance with an exemplary embodiment, a method for calculating clearance of a vehicle comprises: (a) calibrating a transformation between a camera image and a road surface; (b) using the transformation to calculate a scale for each scan line in the camera image; (c) locating a license plate of the vehicle in the image; (d) calculating a horizontal and a vertical scale of the license plate; (e) comparing the horizontal scale of the license plate with a scale of each scan line and a scan line where the scales are equal is found; (f) calculating a number of scan lines between the matching scan line and a top of the license plate; (g) dividing the number of scan lines by the vertical scale of the number plate to find a height of the license plate from the ground; (h) calculating a number of scan lines between the top of the license plate and a lowest visible part of the vehicle; (i) dividing the number of scan line between the top of the license plate and the lowest visible part of the vehicle by the vertical scale of the number plate to find a distance between the top of the license plate to the lowest visible part of the vehicle; and (j) subtracting the distance in step (i) from the distance in step (g) to obtain the ground clearance of the vehicle.

In accordance with a further exemplary embodiment, a system for classification of vehicles comprises: a camera for capturing images of at least one moving object; and a computer processing unit, which performs the following steps: (a) calibrating a transformation between a camera image and a road surface; (b) using the transformation to calculate a scale for each scan line in the camera image; (c) locating a license plate of the vehicle in the image; (d) calculating a horizontal and a vertical scale of the license plate; (e) comparing the horizontal scale of the license plate with a scale of each scan line and a scan line where the scales are equal is found; (f) calculating a number of scan lines between the matching scan line and a top of the license plate; (g) dividing the number of scan lines by the vertical scale of the number plate to find a height of the license plate from the ground; (h) calculating a number of scan lines between the top of the license plate and a lowest visible part of the vehicle; (i) dividing the number of scan line between the top of the license plate and the lowest visible part of the vehicle by the vertical scale of the number plate to find a distance between the top of the license plate to the lowest visible part of the vehicle; and (j) subtracting the distance in step (i) from the distance in step (g) to obtain the ground clearance of the vehicle.

In accordance with a further exemplary embodiment, a computer program product comprising a non-transitory computer usable medium having a computer readable code embodied therein for classification of passenger vehicles and measuring their properties from a rear view video frame, the computer readable program code is configured to execute a process, which includes the steps of: (a) calibrating a transformation between a camera image and a road surface; (b) using the transformation to calculate a scale for each scan line in the camera image; (c) locating a license plate of the vehicle in the image; (d) calculating a horizontal and a vertical scale of the license plate; (e) comparing the horizontal scale of the license plate with a scale of each scan line and a scan line where the scales are equal is found; (f) calculating a number of scan lines between the matching scan line and a top of the license plate; (g) dividing the number of scan lines by the vertical scale of the number plate to find a height of the license plate from the ground; (h) calculating a number of scan lines between the top of the license plate and a lowest visible part of the vehicle; (i) dividing the number of scan line between the top of the license plate and the lowest visible part of the vehicle by the vertical scale of the number plate to find a distance between the top of the license plate to the lowest visible part of the vehicle; and (j) subtracting the distance in step (i) from the distance in step (g) to obtain the ground clearance of the vehicle.

In accordance with an exemplary embodiment, a method for calculating clearance of a vehicle comprises: calibrating a transformation between a camera image and a road surface; detecting locations of a feature on the vehicle for which a clearance is to be calculated; detecting locations of a vehicle shadow; tracking the locations of the feature on the vehicle and the vehicle shadow over time; inverting the locations of the feature of the vehicle and the shadow and calculating differences between the location inverses; using a relationship between the differences and a height of the vehicle to calculate a distance between a lowest visible part of the vehicle from the rear view and the road based on the difference between a height of the vehicle; and classifying the vehicle based on the clearance of the vehicle.

In accordance with a further exemplary embodiment, a system for calculating clearance of a vehicle comprises: a camera for capturing images of at least one moving object; and a computer processing unit, which performs the following steps: calibrating a transformation between a camera image and a road surface; detecting locations of a feature on the vehicle for which a clearance is to be calculated; detecting locations of a vehicle shadow; tracking the locations of the feature on the vehicle and the vehicle shadow over time; inverting the locations of the feature of the vehicle and the shadow and calculating differences between the location inverses; using a relationship between the differences and a height of the vehicle to calculate a distance between a lowest visible part of the vehicle from the rear view and the road based on the difference between a height of the vehicle; and classifying the vehicle based on the clearance of the vehicle.

In accordance with another exemplary embodiment, a computer program product comprising a non-transitory computer usable medium having a computer readable code embodied therein for classification of passenger vehicles and measuring their properties from a rear view video frame, the computer readable program code is configured to execute a process, which includes the steps of: calibrating a transformation between a camera image and a road surface; detecting locations of a feature on the vehicle for which a clearance is to be calculated; detecting locations of a vehicle shadow; tracking the locations of the feature on the vehicle and the vehicle shadow over time; inverting the locations of the feature of the vehicle and the shadow and calculating differences between the location inverses; using a relationship between the differences and a height of the vehicle to calculate a distance between a lowest visible part of the vehicle from the rear view and the road based on the difference between a height of the vehicle; and classifying the vehicle based on the clearance of the vehicle.

In accordance with an exemplary embodiment, a method for classification of vehicles comprises: (a) calibrating a transformation between a camera image and a road surface; (b) detecting moving objects on the road surface in the camera image; (c) establishing a vertical axis of symmetry for each of the moving objects; (d) detecting dominant horizontal edges intersecting with the vertical axis of symmetry for each of the moving objects; (e) tracking the dominant horizontal edges for a plurality of consecutive video frames; (f) projecting each of the dominant horizontal edges onto a ground plane; (g) treating each pair of adjacent projected edges as a projected surface; (h) calculating changes in the projected surface; and (i) calculating distinct structural signatures from the changes in the projected surfaces which are sent to a classifier.

In accordance with a further exemplary embodiment, a system for classification of vehicles comprises: a camera for capturing images of at least one moving object; and a computer processing unit, which performs the following steps: (a) calibrating a transformation between a camera image and a road surface; (b) detecting moving objects on the road surface in the camera image; (c) establishing a vertical axis of symmetry for each of the moving objects; (d) detecting dominant horizontal edges intersecting with the vertical axis of symmetry for each of the moving objects; (e) tracking the dominant horizontal edges for a plurality of consecutive video frames; (f) projecting each of the dominant horizontal edges onto a ground plane; (g) treating each pair of adjacent projected edges as a projected surface; (h) calculating changes in the projected surface; and (i) calculating distinct structural signatures from the changes in the projected surfaces which are sent to a classifier.

In accordance with a further exemplary embodiment, a computer program product comprising a non-transitory computer usable medium having a computer readable code embodied therein for classification of passenger vehicles and measuring their properties from a rear view video frame, the computer readable program code is configured to execute a process, which includes the steps of: (a) calibrating a transformation between a camera image and a road surface; (b) detecting moving objects on the road surface in the camera image; (c) establishing a vertical axis of symmetry for each of the moving objects; (d) detecting dominant horizontal edges intersecting with the vertical axis of symmetry for each of the moving objects; (e) tracking the dominant horizontal edges for a plurality of consecutive video frames; (f) projecting each of the dominant horizontal edges onto a ground plane; (g) treating each pair of adjacent projected edges as a projected surface; (h) calculating changes in the projected surface; and (i) calculating distinct structural signatures from the changes in the projected surfaces which are sent to a classifier.

The details of one or more embodiments of the disclosure are set forth in the accompanying drawings and the description below. Other features, objects, and advantages will be apparent from the description and drawings, and from the claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 2 shows an example of the hierarchal classification system for detecting a blob of a large vehicle versus a small vehicle.

FIG. 3 shows an example of the classification system for classification between a trucks and a bus in accordance with an exemplary embodiment.

DETAILED DESCRIPTION

A Video Based Hierarchical Vehicle Classification System

Figure 1:
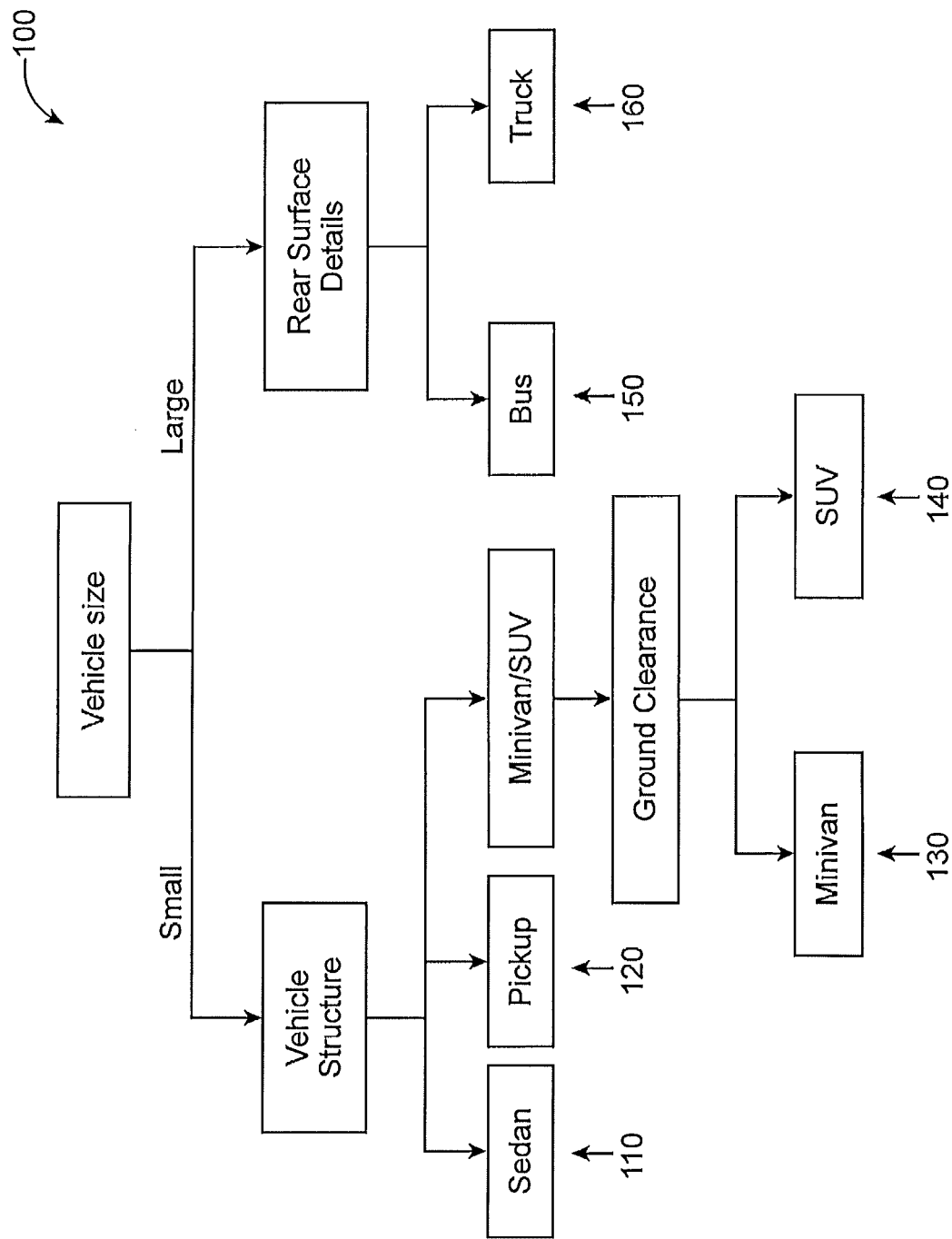
FIG. 1 shows a diagram of a hierarchal classification system in accordance with an exemplary embodiment.

In accordance with an exemplary embodiment, a software system for hierarchical classification of vehicles from their rear view videos is described herein. Vehicles are typically classified into one of the six (6) classes: sedans, pickups, minivans, SUVs (Sports Utility Vehicles), buses and trucks. At this time, it is believed that no such system exists for classifying on-road civilian vehicles. State of the art video based vehicle classifiers classify the vehicles based on their size alone. Consequently, they fail in fine grain classification of various passenger and commercial vehicles. In accordance with an exemplary embodiment, the video based hierarchical vehicle classification system 100 as shown in FIG. 1, which classifies the vehicles into one of six (6) classifications, which include sedans 110, pickups 120, minivans 130, SUVs (Sports Utility Vehicles) 140, buses 150, and trucks 160. The system preferably includes a camera pointed at a road lane such that the horizontal scan lines of the camera are parallel to the horizon. Once the camera has been positioned, the system detects the following:

System first detects the lanes on the road:

With edge detection techniques and voting methods such as Hough transform, the lanes on the road or roadway are detected. If multiple lanes are detected, a lane of interest is selected based on its properties such as the visibility from camera, traffic density, etc. For multiple lanes, each of the multiple lanes are processed by implementing the system for each of the detected lanes.

The system locates moving object in the video using moving object detection:

Using standard moving object detection techniques, moving objects from the video are detected. In accordance with an exemplary embodiment, if multiple moving objects are detected they are processed individually.

Based on the size of the object, the large or small vehicle classifier is activated:

Passenger and commercial vehicles can be differentiated from each other based on their size. Unlike state of the art systems, which aim to carry out the fine grain classification of a vehicle based on its size, in accordance with an exemplary embodiment, an alternative approach as described herein uses size to separate passenger and commercial vehicles, which is more reliable. The state of the art systems detect size of the moving blob to achieve size based classification. In accordance with an exemplary embodiment, the decision about the size of a vehicle 200 is based on the width of the blob in comparison to the lane width as shown in FIG. 2, which allows the system to make a small/large decision even if the entire vehicle has not entered the view of the camera. For example, as shown in FIG. 2, the leading edge 202 of a large vehicle 210 occupies most of the lane, e.g., more than 90%, while the leading edge 202 of a small vehicle 220 occupies less, e.g., less than 90%. Thus, a decision can be taken or made earlier than compared to the blob based approach.

The small vehicle classifier has the following steps:

Based on the structure, the vehicles are classified into sedan, pickup and minivan+SUV classes. In accordance with an embodiment, if a vehicle is classified as Minivan+SUV, the Minivan+SUV classifier is activated. If an exception case is detected the exception classifier is activated.

The large vehicle classifier has the following steps:

In accordance with an exemplary embodiment, in step 1, a vertical axis of bilateral symmetry of the moving object is established. In step 2, asymmetric parts of the detected object such as shadow are separated. In step 3, dominant vertical edges in the object are detected. In step 4, if one or multiple dominant vertical edges are present in the vicinity of the vertical axis of symmetry, the object is classified as a truck. In step 5, if a symmetric pair of dominant vertical edges, towards the left and right extremities of an object is present, the object is classified as a truck. Alternatively, in step 6, if the object does not have a symmetric pair of dominant vertical edges, towards the left and right extremities, the object is classified as a bus.

FIG. 3 shows a plurality of images 300 of a rear portion of trucks 310 and a bus 320, wherein the trucks 310 have a symmetric pair of dominant vertical edges 330, towards the left and right extremities, and the bus 320 does not have a symmetric pair of dominant vertical edges, towards the left and right extremities. In step 7, if an exception case is detected, the exception classifier is activated.

The Minivan/SUV (Minivan+SUV) classifier has the following steps:

In accordance with an exemplary embodiment, the ground clearance of the vehicle (moving object) is estimated, if the object has high ground clearance, it is classified as a SUV. Alternatively, if the object has low ground clearance, it is classified as Minivan; and if an exception case is detected the exception classifier is activated.

Figure 4:
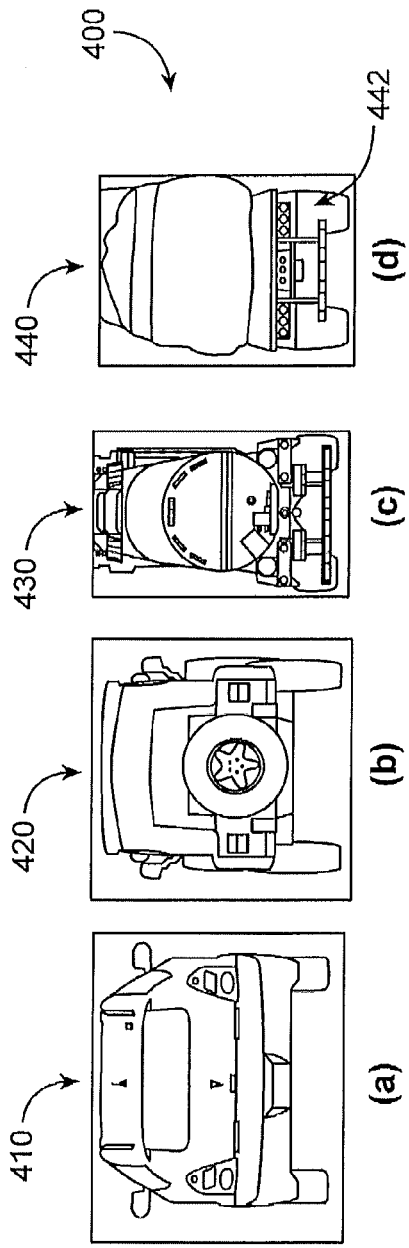
FIG. 4 shows examples of exception classification in accordance with an exemplary embodiment.

The exception classifier incorporates rules to reclassify objects, which the preceding set of classifier fails to classify:

In accordance with another exemplary embodiment, elements of this classifier can be reconfigured. For example, hatchback sedan: if a small vehicle is classified as Minivan/SUV, but has a smaller blob size then reclassify it as a hatchback sedan/station wagon 410 as shown in FIG. 4*a*; SUV with spare wheel mounted on rear: if a small vehicle with circular symmetry of size of a wheel is detected on the rear of the vehicle, then classify it as SUV 420 as shown in FIG. 4*b*; Tanker trucks: if a large vehicle with non-rectangular shaped rear is detected, then classify it as a tanker truck 430 as shown in FIG. 4*c*; and Truck: if a large vehicle with reflective tape patter of red-white 442 is detected, then classify the vehicle as a truck 440 as shown in FIG. 4*d*.

Applications of the system:

The system and method as described herein can be used for: classifying vehicles on the road; separating commercial and passenger vehicles; identifying commercial and passenger vehicles for automatic category based tolling; detecting lane restriction violations for law enforcement; traffic analysis; and/or security related applications ensuring limited/controlled access to vehicles.

Variations of the system:

The system as described herein can be implemented for classifying the vehicles from back and/or front and/or side views. Alternatively, a partial classifier, which detects only a few of the classes, can be implemented. In addition, parts of or the complete system can be implemented as equivalent hardware implementation.

In accordance with another exemplary embodiment, a computer program product comprising a non-transitory computer usable medium having a computer readable code embodied therein for classification of passenger vehicles and measuring their properties from a rear view video frame. The computer readable program code is configured to execute a process, which includes the steps of: locating a moving object using a moving object detection system; determining if the moving object is a small vehicle or a large vehicle based on the size of the moving object; and assigning the moving object to a classifier based on the size of the moving object.

The computer usable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

A Vehicle Ground Clearance Measurement System

A method and system, which calculates clearance of a vehicle part such as a bumper from the road or ground from their rear view video is disclosed herein. In accordance with an exemplary embodiment, the method and system provides the separation between Minivan and SUV (Sports Utility Vehicle) class from a rear view, which is not possible from other measurements such as size, length, width, motion tracks, and shape profile.

Figure 5:
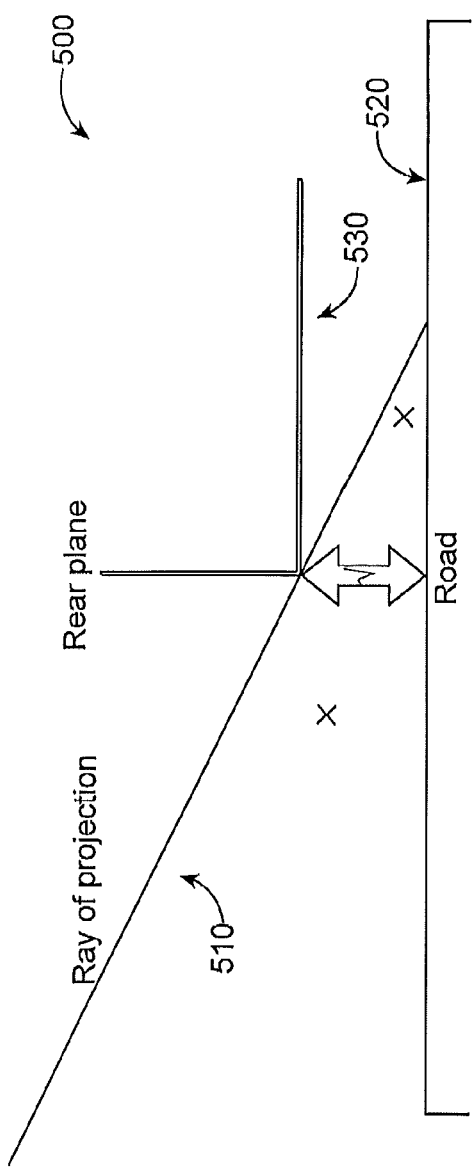
FIG. 5 shows an exemplary setup for a vehicle ground clearance measurement system in accordance with an embodiment.
Figure 7:
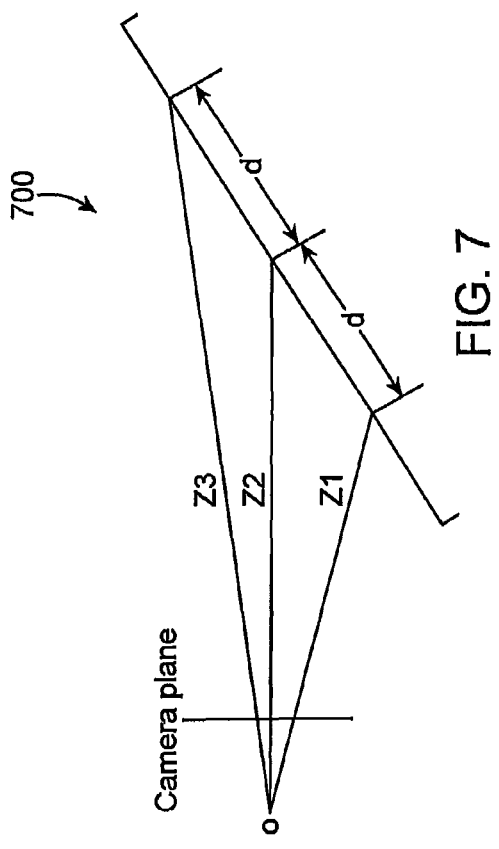
FIG. 7 shows a camera plane for a plurality of locations on a road surface.
Figure 6:
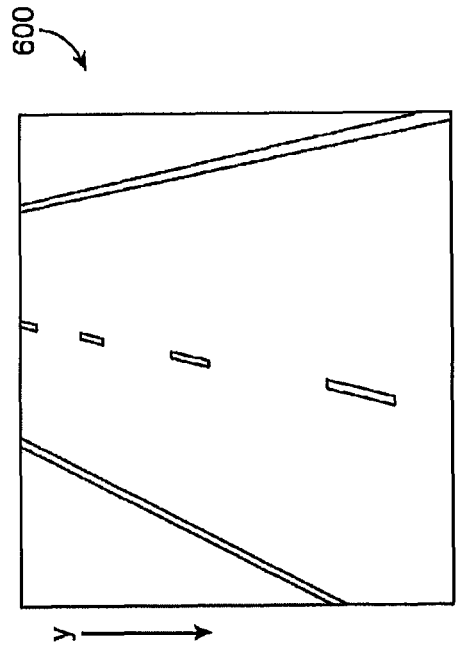
FIG. 6 shows a perspective image of a road surface, which provides a baseline for use with the vehicle ground clearance measurement system as shown in FIG. 5.

In accordance with an exemplary embodiment, the system includes a camera, which is setup in such a way that its horizontal scan lines are parallel to the horizon. Additionally, the camera is preferably configured to see one of the lanes of the road. FIGS. 5-7 shows the basis setup of the system, which includes a camera (not shown) having a ray of projections 410 onto the road surface 420, which intersects a rear bumper of a vehicle 430. FIG. 6 shows an exemplary road surface 600 from a perspective view, and the different camera angles 700 as shown in FIG. 7. In accordance with an exemplary embodiment, the calibration phase, a scale for each scan line in the image is calculated. Under perspective projection, objects are scaled in inverse proportion to there distance to the camera, where $$x = \frac{Xf}{Z}, y = \frac{Yf}{Z}.$$

If scan lines of the camera are parallel to the horizon, the projection of the y th scan line on the road has a scale associated with it, e.g., scale (y). The scale in pixels/foot can be computed from the lane width. For each scan line, if the distance between two imaged points on the road is known, a scale can be established. For example, lane extremities L and R can be detected for each scan line and lane width is known to be 12 feet. For each scan line y the system finds a scale S(y) as ratio of number of pixels between the two points and distance between them on the road.

Locating the license plate of the vehicle in the image

Figure 8:
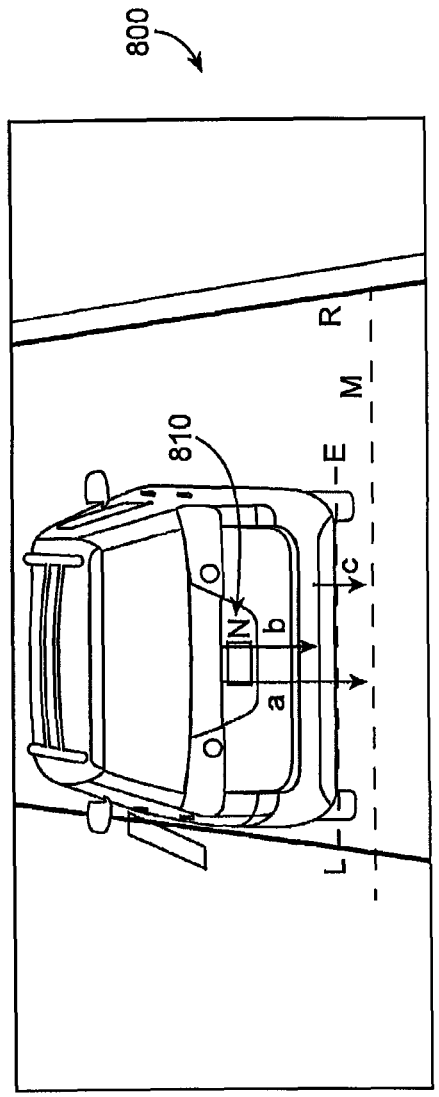
FIG. 8 shows a diagram a vehicle clearance estimation in accordance with an exemplary embodiment.

FIG. 8 shows a diagram a vehicle clearance estimation 800 in accordance with an exemplary embodiment. As shown in FIG. 8, with help of an automatic license plate recognition (ALPR) module the system locates the license plate N 810 of the vehicle.

Calculating horizontal and vertical scale for the license plate

Horizontal scale $S_H(LP)$ of the plate 810 is calculated as the ratio of width in pixels to width in feet. Similarly, vertical scale $S_V(LP)$ of the plate 810 is calculated as the ratio of height in pixels to height in feet.

Carrying out scale matching

Horizontal scale of the license plate $S_H(LP)$ is compared with the scale of each scan line S(y) and the scan line M where the scales are equal is found.

Calculating height of the license plate

Number of scan lines between matching scan line M and top of the license plate is calculated. This number is divided by the vertical scale $S_V(LP)$ of the number plate to find height a of the license plate from the ground.

Calculating distance between the lowest edge of the vehicle and top of license plate The Number of scan lines between the top of the license plate and the lowest visible part of the vehicle is calculated. This number is divided by the vertical scale of the number plate to find distance b between top of the license plate to the lowest visible part E of the vehicle.

Calculating ground clearance

Figure 9:
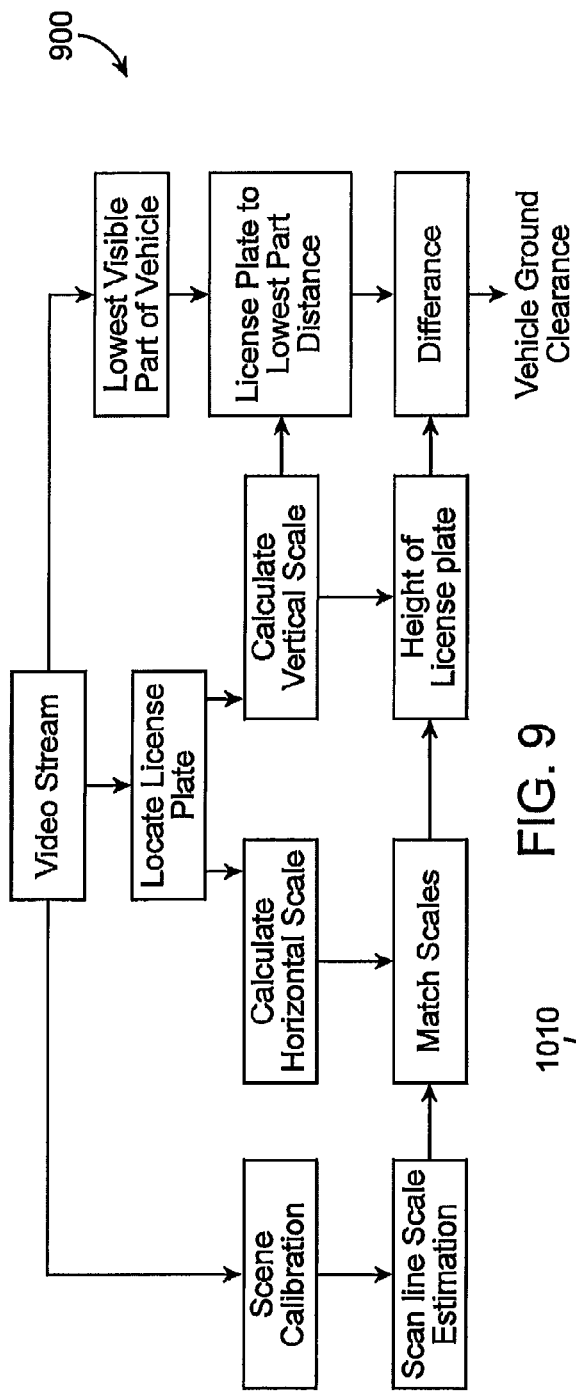
FIG. 9 shows a flow chart of a vehicle clearance estimation system in accordance with an exemplary embodiment.

Distance b is subtracted from distance a to find ground clearance c of the vehicle. FIG. 9 shows a flow chart of a vehicle clearance estimation system 900 in accordance with an exemplary embodiment as described above.

Applications

Ground clearance can be estimated as a feature in vehicle classification e.g. distinguishing between a Minivan and SUV (sport utility vehicle), busses, and trucks.

Alternate implementations

Figure 10:
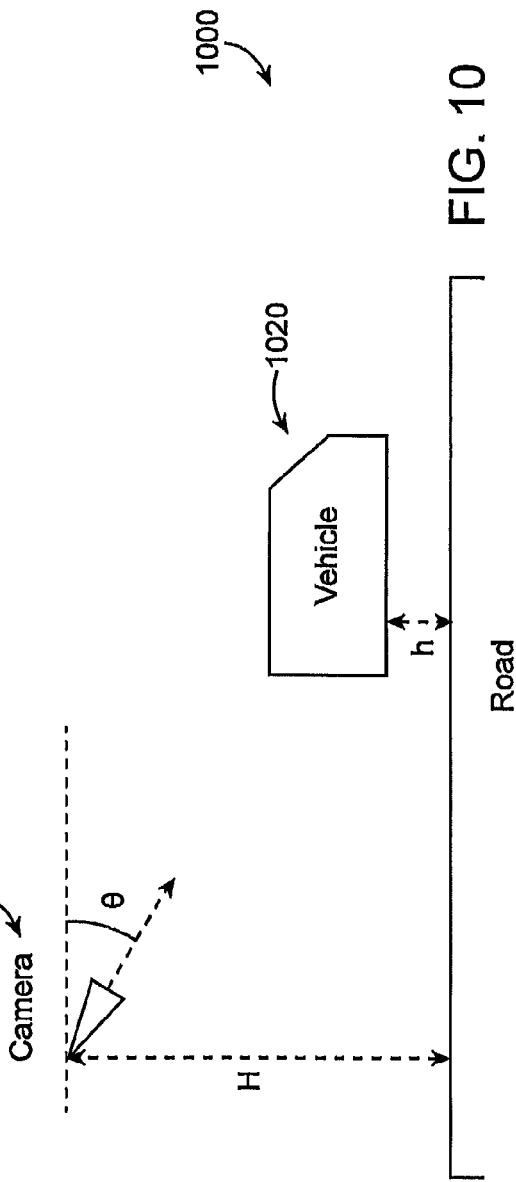
FIG. 10 shows another exemplary setup for a vehicle ground clearance measurement system in accordance with an exemplary embodiment.
Figure 11:
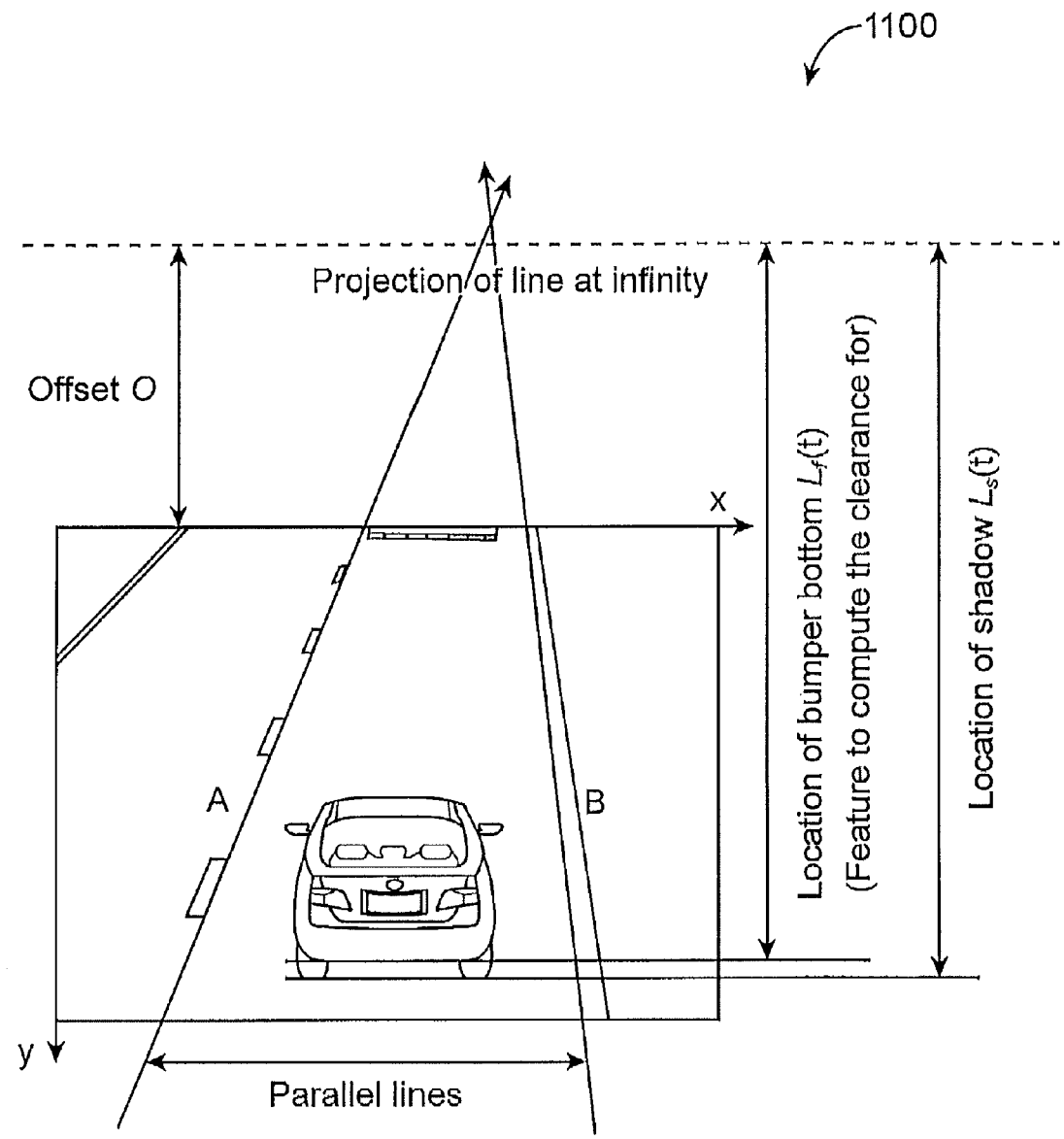
FIG. 11 shows an image captured by the setup for the vehicle ground clearance measurement system as shown in FIG. 10.

Instead of the license plate, other known dimensions on the vehicle rear surface can also be used to compute the scales on the vehicle. For example as shown in FIG. 10, a system and method is described, which provides for the determination between Minivan and SUV class from a rear view, which is not possible from other measurements such as size, length, width, motion tracks, and shape profile. As shown in FIG. 10, the system 1000 includes a camera 1010, which is setup in such a way that its horizontal scan lines are parallel to the horizon. Additionally, the camera 1010 captures a vehicle 1020 by seeing at least a part of one of the lanes of the road 1030. FIG. 11 shows an image 1100 captured by the camera 1010 as shown in FIG. 10. The following steps are taken:

The camera parameters are measured

In order to measure the ground clearance h of vehicles, the vehicles are observed through a camera. Before the clearance can be computed, camera height H, camera depression angle θ and camera focal length f are measured.

The projection of the line at infinity is found

The line at infinity is established as a horizontal line passing through the intersection of two parallel lines in the image. These lines can be lane markings A and B as shown in FIG. 11.

Calculate offset for the location of features.

Vehicle features are captured by the camera at the horizontal image coordinate x and the vertical image coordinate y. The vehicle is recorded by the camera as it moves away in a road lane. Only change in vertical coordinate y of the vehicle features is significant. Locations of vehicle feature are calculated with respect to the projection of line at infinity. This is achieved by adding an offset O to the image location y. The offset added is the difference between y image coordinate of the first horizontal scan line of the image and y image coordinate of the projection of line at infinity. For feature at image coordinate ($C_x$, $C_y$), its location is calculated as $L_f = C_y + O$.

Location of the feature for which the clearance is to be estimated is detected.

In general, clearance of a vehicle is the distance between the lowest visible part of the vehicle from the rear view and the road. Alternatively, it can be distance between top/middle/bottom of the bumper and the road. The feature can be detected though combination of image processing and pattern recognition techniques such as edge detection, region segmentation, clustering and classification. If detected feature has more than one value for y image coordinate, a representative value $R_y$ is used to compute the features location. Choices for $R_y$ are the largest or smallest y value, most frequent y value or weighted sum of y values etc. As the largest value of y represents the lowest part of the feature, it is the typical choice. Location of the feature in frame t is calculated as $L_f(t) = R_y + O$.

Location of vehicle shadow is detected.

For the vehicle, its shadow is located. The shadow can be located in different ways: based on the position of the sun or other dominant light source, camera and road geometry; based on symmetry reasoning as shadows are asymmetric; based on the image location as shadows are cast underneath the vehicle; based on intensity as shadows lower the intensity of the object they fall on. If detected shadow has more than one value for y image coordinate, a representative value $S_y$ is used to compute the features location. Choices for $S_y$ are the largest or smallest y value, most frequent y value or weighted sum of y values etc. As the largest value of y represents the lowest part of the shadow, it is the typical choice. Location of the feature in frame t is calculated as $L_s(t) = S_y + O$.

Locations of the vehicle part $L_f$ and shadow $L_s$ are tracked with time.

Vehicle moves with time and correspondingly shadow and vehicle parts also move in the pictures captured by the camera. Using properties such as intensity, color, edges, regions, image location etc. Both shadow and vehicle part locations are tracked with time. Locations of feature are stored as $L_f(t+1)$, $L_f(t+2)$ and so on. Similarly, Locations of shadow are stored as $L_s(t+1)$, $L_s(t+2)$ and so on. The tracking is continued for N frames. Here N>1 and N≤number of frames vehicle is visible to camera.

Differences between location inverses are computed.

For each frame, feature and shadow locations are inverted.

$$L_f^{-1}(t+n) = \frac{1}{L_f(t+n)}, L_s^{-1}(t) = \frac{1}{L_s(t+n)}$$

Where n=0, 1, 2 . . . , N. Differences between location inverses of different frames are calculated.

$$D_f(t, n_1, n_2) = L_f^{-1}(t+n_2) - L_f^{-1}(t+n_1)$$

$$D_s(t, n_1, n_2) = L_s^{-1}(t+n_2) - L_s^{-1}(t+n_1)$$

Typically $n_2 - n_1 = 1$ i.e. the differences are computed for consecutive frames.

Using relationship between the differences and the height of the vehicle part, the clearance of the vehicle is calculated.

For an object moving at speed a between frames n and n+1, the difference between the inverse of locations of a feature whose clearance is h from the road is $$D_f(t, n, n+1) = \frac{\alpha \cos^2 \theta}{(H-h)f} = \frac{\text{Constant}}{H-h}$$

If speed a is known, then above equation is solved to find clearance h. If speed a is unknown additional analysis is carried out. For shadow, h=0 as shadow is cast on the road.

$$D_s(t, n, n+1) = \frac{\alpha \cos^2 \theta}{Hf} = \frac{\text{Constant}}{H}$$

Figure 12:
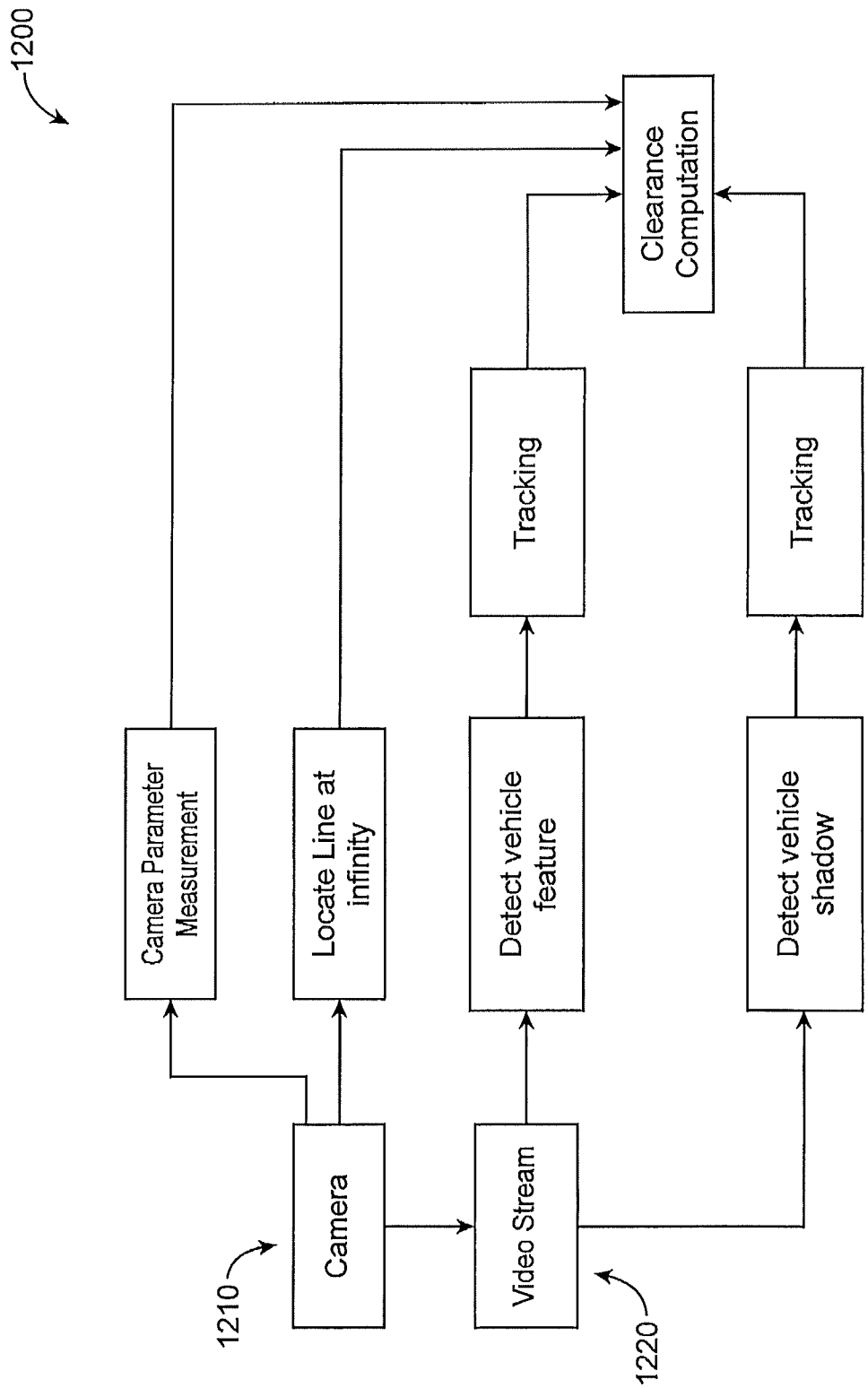
FIG. 12 shows a system diagram of the vehicle ground clearance system as shown in FIG. 10.

The constant in two equations above is the same and is computed by second equation alone. Then the first equation can is used to find the clearance h. FIG. 12 shows a system 1200 diagram of the steps as described above to calculate ground clearance for a vehicle in accordance with an exemplary embodiment. As shown in FIG. 12, the system includes a camera 1210, which provides a video stream 1220 for detecting vehicle features and vehicle shadows, which are used to compute the vehicle clearance as described above.

Exemplary Applications

Ground clearance can be estimated as a feature in vehicle classification e.g. distinguishing between Minivan and SUV, Busses and trucks etc. Height of other vehicle features can also computed which can be used in vehicle classification.

Alternate implementations

The system can be implemented for frontal view videos of the vehicles. In place of the bumper of the vehicle, the system can be used to calculate height of other vehicle parts such as top, windshields etc. When camera is horizontal scan lines are not along the horizon, the images captured by the camera can be rectified to make the scan lines horizontal. The system can then be applied to the rectified image. Clearance estimate can be improved by combining estimates of multiple frames.

In accordance with another exemplary embodiment, a computer program product comprising a non-transitory computer usable medium having a computer readable code embodied therein for classification of passenger vehicles and measuring their properties from a rear view video frame. The computer readable program code is configured to execute a process, which includes the steps of: (a) calibrating a transformation between a camera image and a road surface; (b) using the transformation to calculate a scale for each scan line in the camera image; (c) locating a license plate of the vehicle in the image; (d) calculating a horizontal and a vertical scale of the license plate; (e) comparing the horizontal scale of the license plate with a scale of each scan line and a scan line where the scales are equal is found; (f) calculating a number of scan lines between the matching scan line and a top of the license plate; (g) dividing the number of scan lines by the vertical scale of the number plate to find a height of the license plate from the ground; (h) calculating a number of scan lines between the top of the license plate and a lowest visible part of the vehicle; (i) dividing the number of scan line between the top of the license plate and the lowest visible part of the vehicle by the vertical scale of the number plate to find a distance between the top of the license plate to the lowest visible part of the vehicle; and (j) subtracting the distance in step (i) from the distance in step (g) to obtain the ground clearance of the vehicle.

The computer usable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

A Structural Signature Based Passenger Vehicle Classification and Measurement System In accordance with an exemplary embodiment, the system and methods as described herein rely on structural signatures for classification of vehicles, which are obtained by analysis of multiple (or a plurality) of video frames of passenger vehicles from the rear of the vehicles. The structural signature encodes whether a visible vehicle surface intersecting a vehicle's axis of symmetry is parallel to the road or otherwise. The system and method provides for classification of passenger vehicles and measuring their properties, and more particularly to capturing a vehicle traveling along a road from a single camera and classifying the vehicle into one of the 3 classes: Sedan, Pickup, and/or Minivan and SUV (Sports Utility Vehicle).

Figure 13:
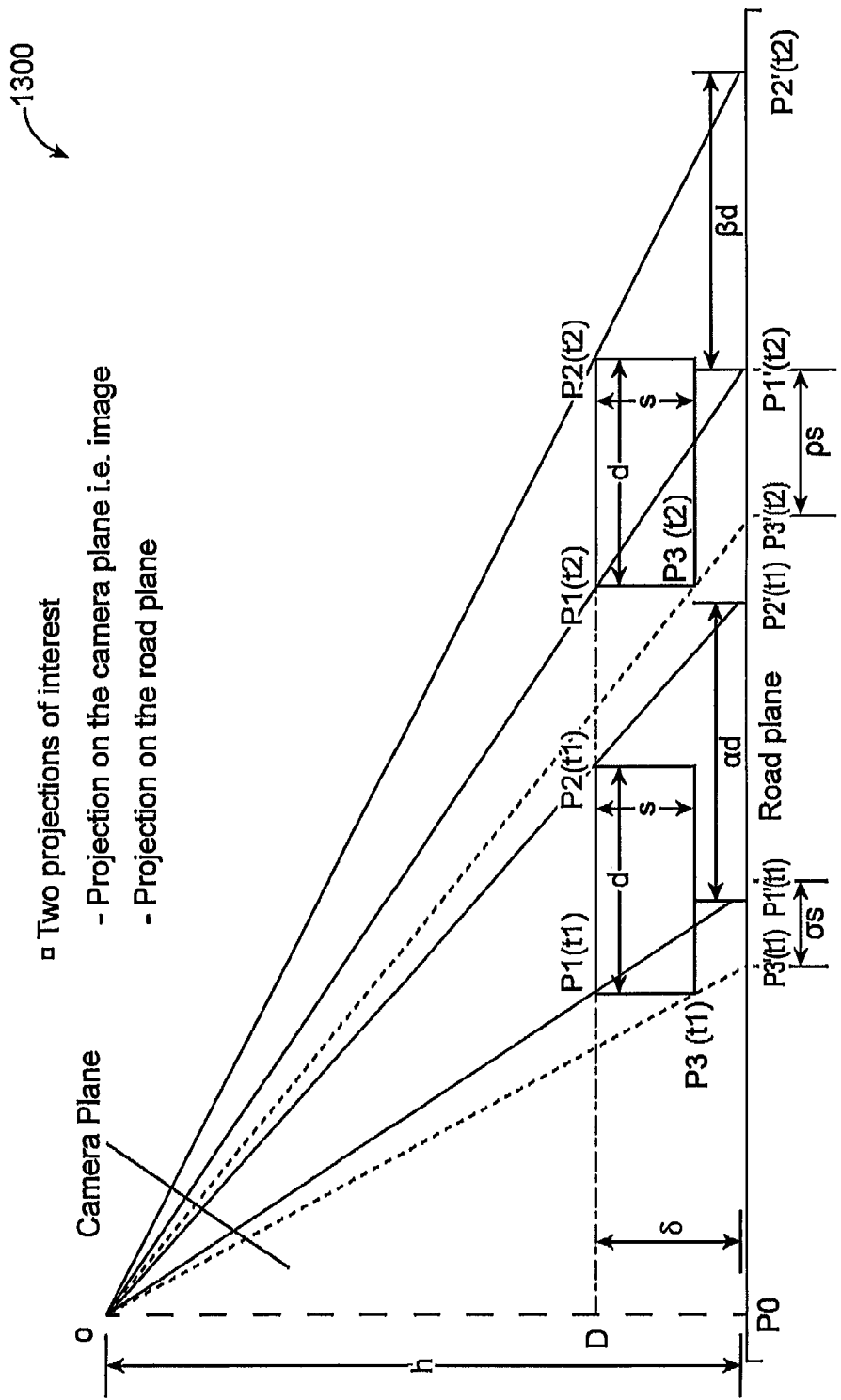
FIG. 13 shows an image of the geometry of projection with time for a moving vehicle from a side view having two projections of interest.
Figure 14:
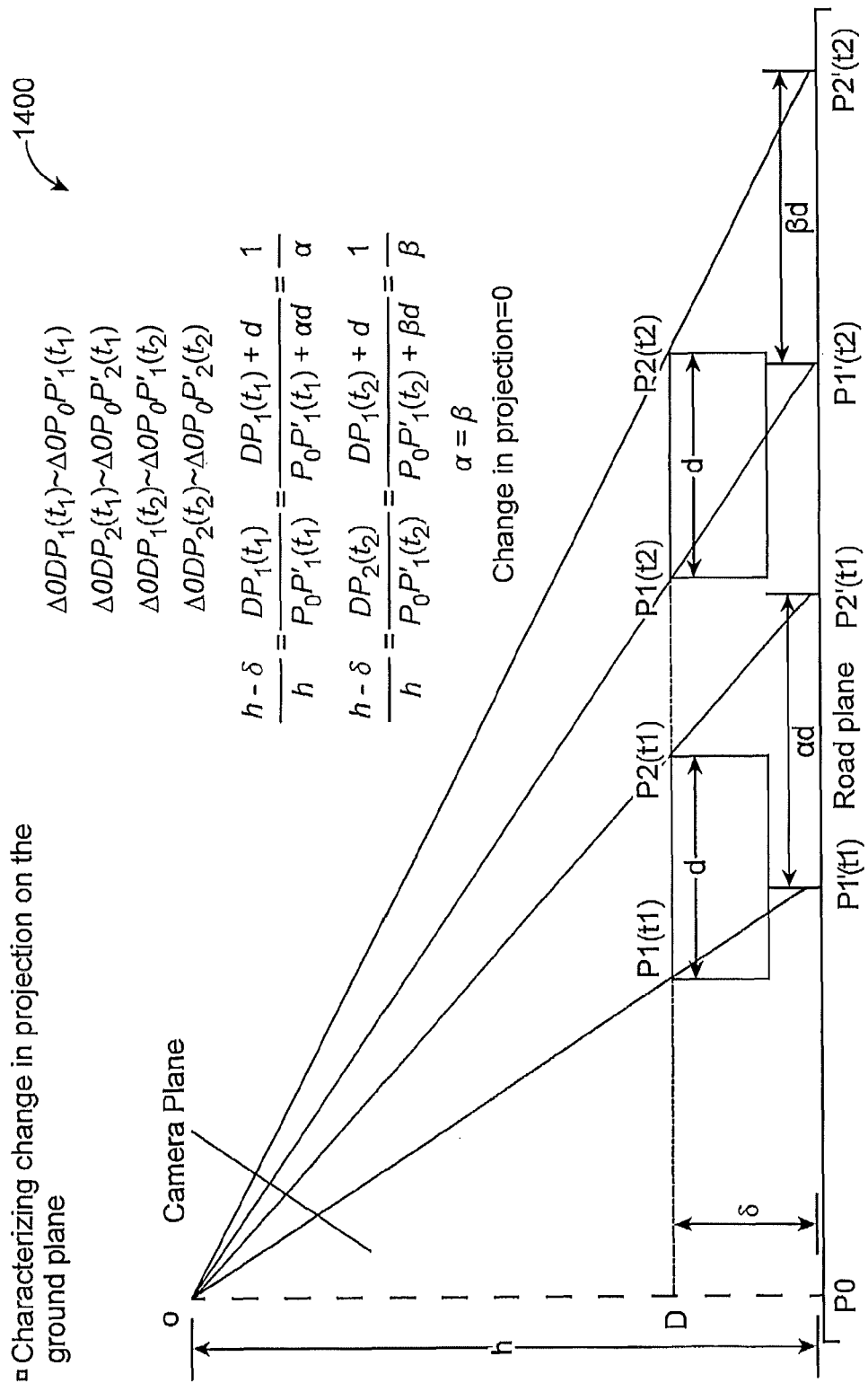
FIG. 14 shows an image and calculations for characterizing change in projection on the ground plane.
Figure 15:
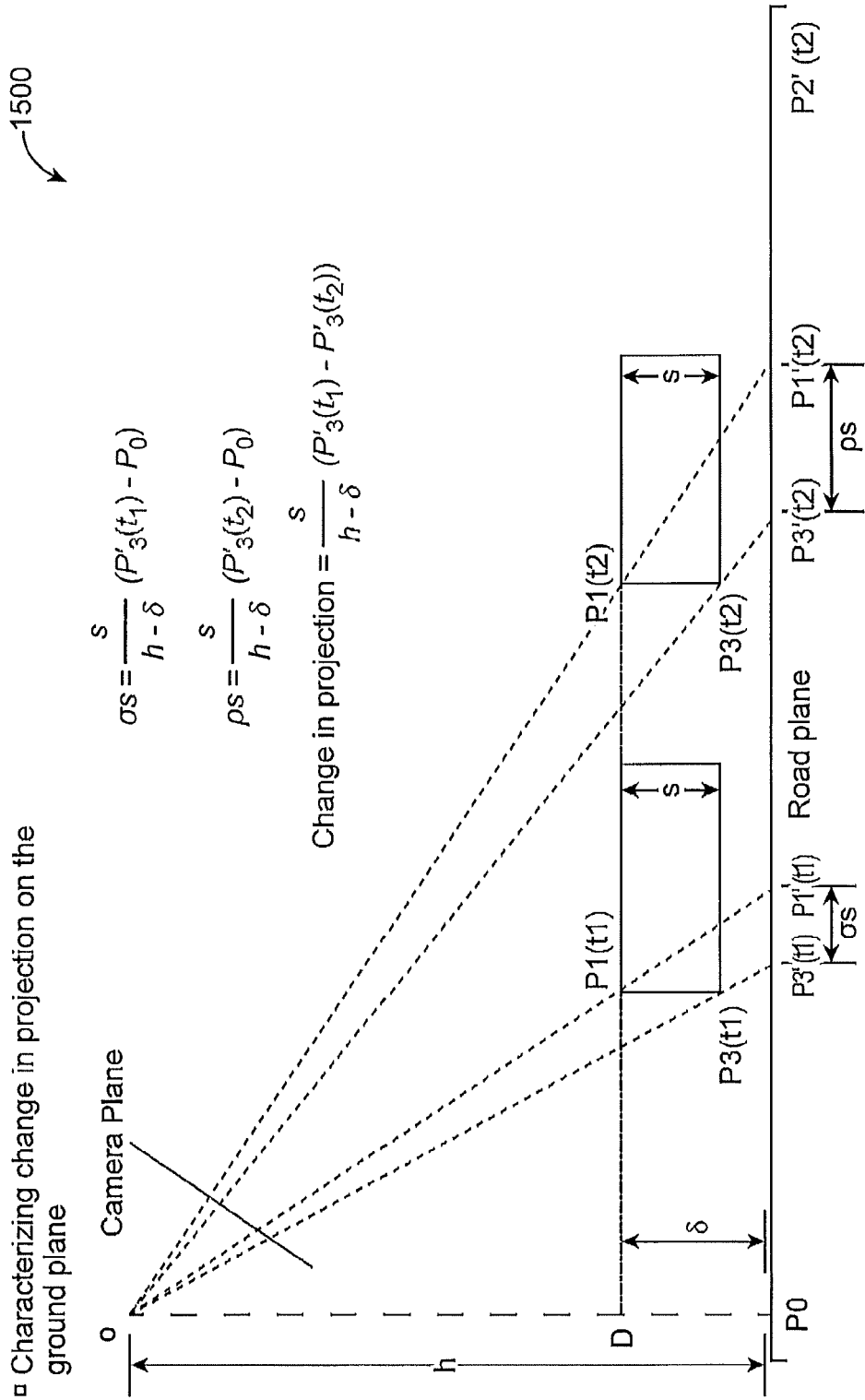
FIG. 15 shows another image and related calculations for characterizing change in the projection on the ground plane.
Figure 16:
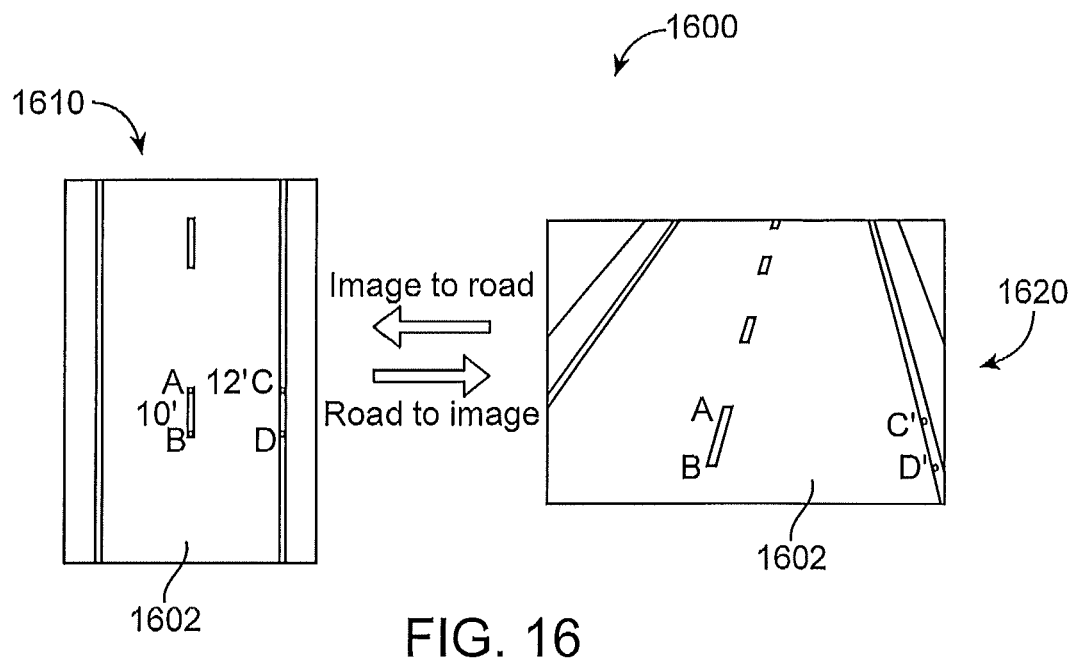
FIG. 16 shows an image of the calibration to establish mapping between a road surface and a camera image in accordance with an exemplary embodiment.

In accordance with an exemplary embodiment, the system and method for classification of vehicles comprises the steps of: calibrating a transformation angle between a camera image and a road surface; detecting moving objects on the road surface; establishing a vertical axis of symmetry for each of the moving objects; detecting dominant horizontal edges intersecting with the vertical axis of symmetry for each of the moving objects; tracking the dominant horizontal edges for a plurality of consecutive vides frames; projecting each of the dominant horizontal edges onto a ground plane; treating each pair of adjacent projected edges as a projected surface; calculating changes in the projected surface; calculating distinct structural signatures from the changes in the projected surfaces; and classifying the distinct structural signatures in a class. For example, as shown in FIGS. 13-15, images 1300 of the geometry of projection with time for a moving vehicle from a side view having two projections of interest, and images 1400, 1500 for characterizing change in projection on the ground plane are obtained. The method preferably includes the following steps:

Step 1—Establishing a Transformation Between the Camera Image and the Road Through Calibration In accordance with an exemplary embodiment, the system establishes through calibration a transformation between the camera image and the road. The calibration establishes a one-to-one correspondence between a camera image point and a point on the road. This correspondence can be established by knowing locations of at least 4 coplanar points, no three of which are collinear, in the image and on the road. FIG. 16 shows a scenario 1600 where two dimensional location of points A, B, C and D 1610 on road, which are known from the pavement marking standards or measurement. Their corresponding two-dimensional locations in the image are A', B', C' and D' 1620 on road, which can be detected by image processing or manually. With these 4 correspondences, the unique transformation can be determined by using projective geometry.

Step 2—Locating a Moving Object in the Video Using Moving Object Detection

Figure 17:
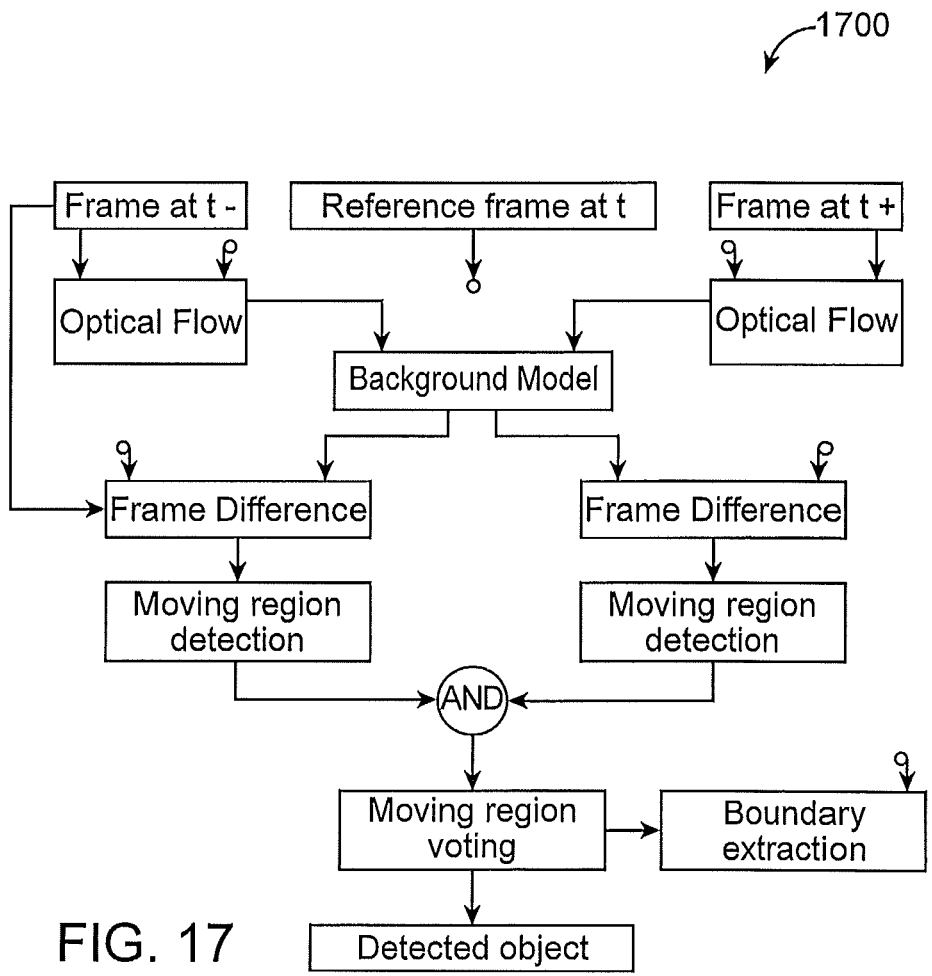
FIG. 17 shows a flow chart of a moving object detection system in accordance with an exemplary embodiment.

In accordance with an exemplary embodiment, the system locates a moving object in the video using moving object detection. A moving object in a video can be detected with various computer vision techniques such as frame difference, change detection and optical flow. If multiple vehicles are detected, each object can be assigned a unique identity based on their properties such as color and location. Thus, each object can now be treated individually for the rest of the classification system. The detection of the moving object provides its boundary and location. In addition, in accordance with an exemplary embodiment, the system 1700 fuses optical flow, frame difference and image segmentation methods to detect moving objects as shown in FIG. 17.

Step 3—Establishing a Vertical Axis of Symmetry of the Object

Figure 18:
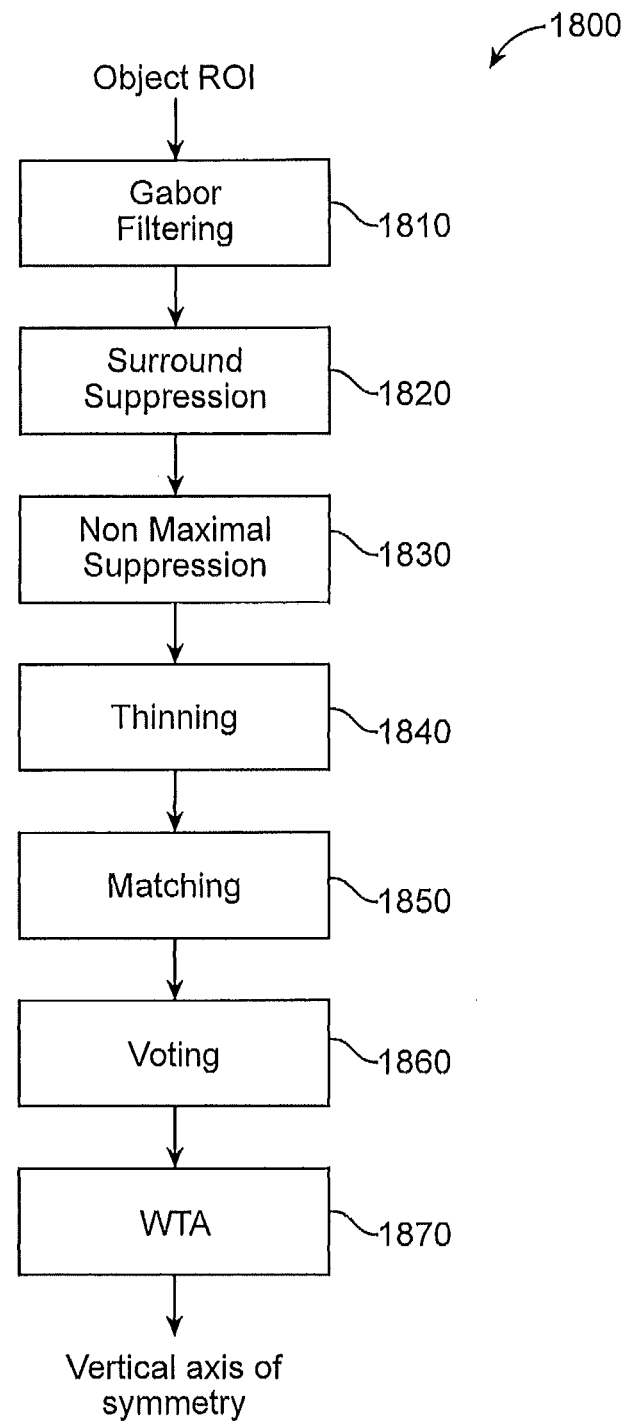
FIG. 18 shows a flow chart of a symmetry detection system in accordance with an exemplary embodiment.

As shown in FIG. 18, a vertical axis of symmetry 1800 of the object is then established. In accordance with an embodiment, the rear view of a vehicle exhibits a strong symmetry along a vertical axis. The visible structure of a vehicle is almost entirely captured along the axis of symmetry. In addition, various methods to establish bilateral symmetry of an object exist. The system preferably establishes an axis of bilateral symmetry by matching Gabor features. The region of interest around the detected moving object is then filtered in step 2 with a set of Gabor filters 1810. In accordance with an exemplary embodiment, the output of the Gabor filter is edge magnitudes and directions. Surround suppression 1820 is carried out on the output of the Gabor filters to eliminate local texture patterns which might interfere with the symmetry detection. Non-maximal suppression 1830 and thinning 1840 are carried as well to avoid spurious edges. The system matches edge points 1850, which have complementary orientations ($\theta$ and $180-\theta$) and which are along the same scan line of the image. Each pair of matched edge points then votes for a vertical axis, which is equidistant from both the edge points. In accordance with an exemplary embodiment, a winner takes all (WTA) approach 1870 can be used and/or other techniques can be applied to the votes 1860 to establish the vertical axis of symmetry of the vehicle.

Step 4—Separating Asymmetric Parts of the Detected Object Such as Shadows

Asymmetric parts of the detected object such as shadow are separated. The sun or other illumination sources cause the vehicle to cast a shadow on the road. The shadow is detected as a part of the moving object by step 2. Since the shadow is asymmetric, it can be eliminated by enforcing axis of symmetry found in step 3 on the detected moving object in step 2. In addition, other methods of shadow removal such as based on physics can be used as well.

Step 5—Detecting Dominant Horizontal Edges Intersecting with the Vertical Axis of Symmetry Dominant horizontal edges intersecting with the vertical axis of symmetry are detected. As shown, images of vehicles exhibit strong horizontal and vertical edges. Most of the horizontal edges seen in a vehicle image are caused by structural changes. The system detects dominant horizontal edges from a vehicle image. Spurious detection of edges is avoided by eliminating the edges, which do not intersect the axis of symmetry detected in step 3.

Step 6—Tracking the Horizontal Edges in Multiple Consecutive Video Frames

The horizontal edges are tracked in multiple consecutive video frames. The system tracks the edges detected in step 5 in multiple following video frames. The tracking is carried out with Lukas-Kanade-Tomasi tracker. Other tracking methods such as correlation based, mean shift can also be applied.

Step 7—Projecting the Edges on the Ground Plane

These edges are now projected onto the ground plane. The locations of the detected and tracked edges from step 5 and 6 are in terms of the 2D (2 dimensional) image coordinates. These are transformed on the 2D road coordinates with the transformation established in step 1.

Step 8—Calculating Changes in the Projected Surfaces Over Time

Changes in the projected surfaces over time are calculated. Each pair of adjacent edges projected in image and on the road is treated as a surface. The system treats the distance between the edges along the axis of symmetry as the height of the surface. For each projected surface, change in height with each tracking step is calculated. In accordance with an exemplary embodiment, various time steps can be used to calculate these changes.

Step 9—Calculating Distinct Structural Signatures from Changes in the Projected Surfaces Distinct structural signatures are calculated from changes in the projected surfaces. If a surface is parallel to the road, height of its projection does not change with time. However, if a surface is not parallel to the road, height of its projection changes with the time. It should be noted that if height of this surfaces were small, the change of projection would be smaller. This might lead to misinterpretation of the small surfaces. To avoid the confusion, the change in projection is normalized with projection at a certain time instant (e.g., initial or final). This leaves the change in projection for surfaces parallel to road close to zero while magnifying the changes in small surfaces.

Figure 19:
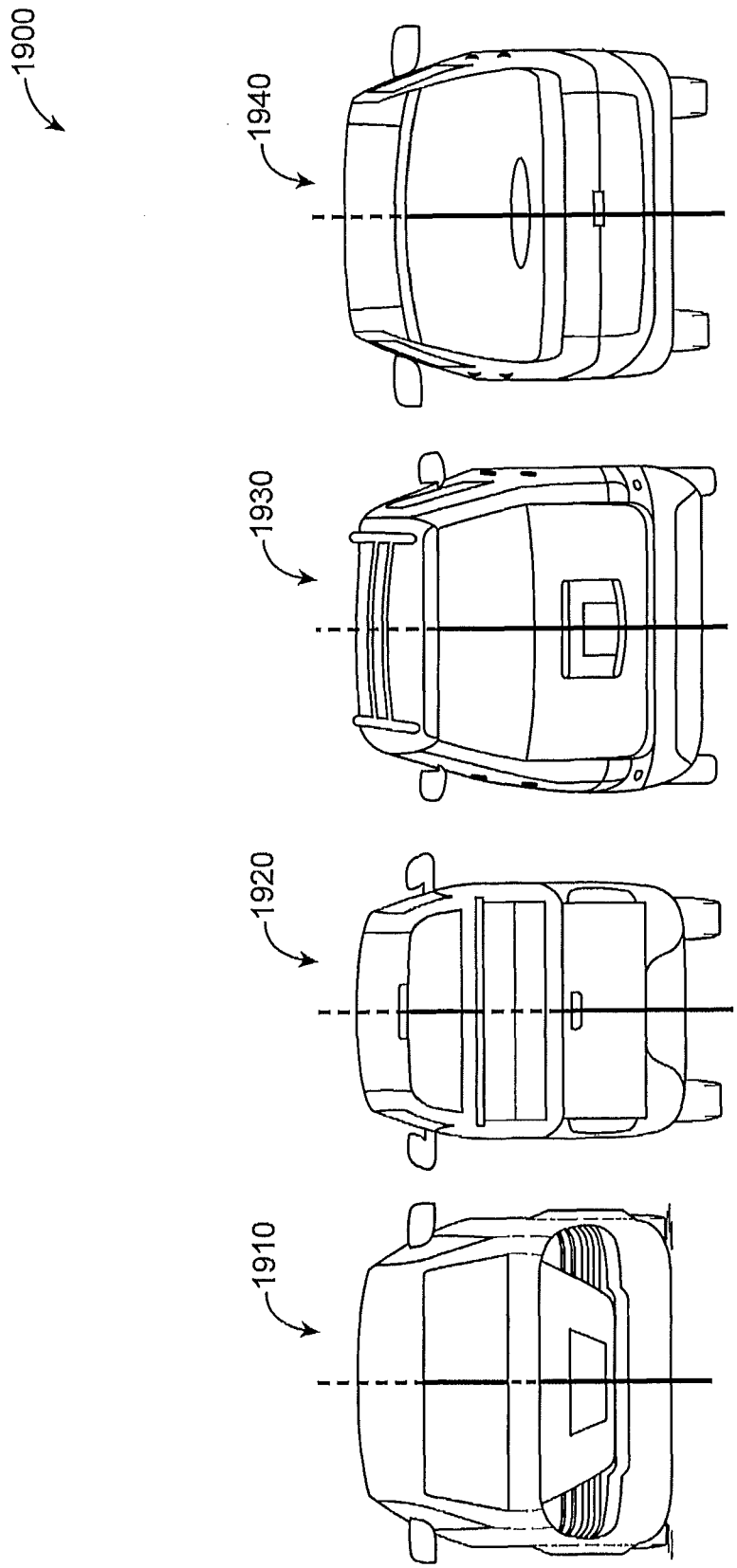
FIG. 19 shows a series of photographs of the structural signatures for a plurality of vehicles.

Step 10—Classifying the Structural Signatures into Sedan, Pickup and Minivan+SUV Classes The structural signatures are classified into Sedan, Pickup and (Minivan+SUV) classes. As structural signatures Sedan 1910, Pickup 1920 and Minivan (1930)+SUV (1940) classes can be represented semantically as {pp, n, p, n}, {p, n, pp, n}, and {pp, nn}, respectively. Here p denotes surface parallel to the road and n denotes surface not parallel to the road. The symbols p and n are repeated to indicate larger lengths. This is shown in FIG. 19 where cross-hatched portions stands for surfaces parallel to the road and non-cross hatched portions for other surfaces. The system passes these signatures to a classifier. Among others, classifier can be chosen to be a sematic classifier, probabilistic classifier or a machine learning based classifier such as SVM. The system uses SVM with radial basis functions as the classifier. For SVM classification the structural signature is expressed numerically. Starting from the top of the detected object to the bottom of the object change in projection is sampled for a fixed number of times along the axis of symmetry such that on the road projection these samples are equidistant.

Figure 20:
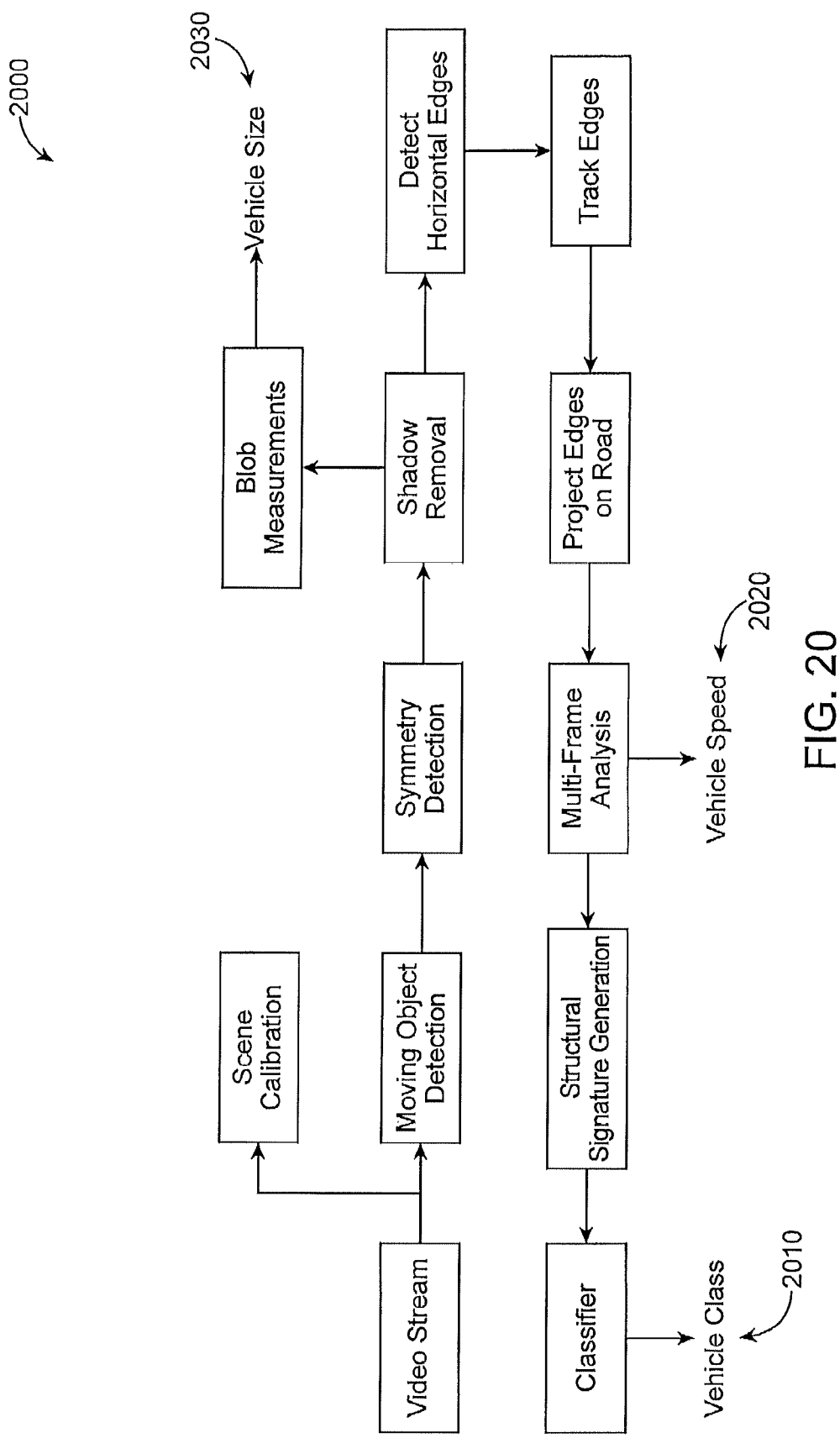
FIG. 20 shows a flow chart of a system diagram in accordance with an exemplary embodiment.

As the classification is being carried out, measurements for vehicle are generated at various steps by the system. After classification Step 4, a symmetric blob, which represents the vehicle, is available. The lower edge of the blob is projected on the road using the transformation in classification Step 1. In accordance with an exemplary embodiment, the projected size is the width of the vehicle. After classification Step 7, location of the lowest projected edge at two different times is preferably used to calculate the speed of the vehicle. FIG. 20 shows a flow chart of a system diagram 2000 for the process as in accordance with an exemplary embodiment. As shown in FIG. 20, the system 2000 includes a video stream 2010, which is analyzed to determine vehicle class 2020, vehicle speed 2030, and vehicle size via a series of steps as described above.

In accordance with an exemplary embodiment, applications of the system can include classifying passenger vehicles on the roads; parking garage or parking lot allocation can be carried out based on vehicle class; vehicle speed measurement for law enforcement; and security related applications ensuring limited/controlled access to vehicles.

In addition, variations of the system can include and are not limited to: the system can be implemented for classifying the vehicles from front and side views; only the classifier part of the system can be implemented; only measurement part of the system can be implemented; only speed measurement can be implemented; only size measurement can be implemented; partial classifier which detects only one or two of the classes can be implemented; and the parts of or the complete software system can be implemented as equivalent hardware implementation.

In accordance with another exemplary embodiment, a computer program product comprising a non-transitory computer usable medium having a computer readable code embodied therein for classification of passenger vehicles and measuring their properties from a rear view video frame. The computer readable program code is configured to execute a process, which includes the steps of: a method for classification of vehicles comprising: (a) calibrating a transformation angle between a camera image and a road surface; (b) detecting moving objects on the road surface in the camera image; (c) establishing a vertical axis of symmetry for each of the moving objects; (d) detecting dominant horizontal edges intersecting with the vertical axis of symmetry for each of the moving objects; (e) tracking the dominant horizontal edges for a plurality of consecutive video frames; (f) projecting each of the dominant horizontal edges onto a ground plane; (g) treating each pair of adjacent projected edges as a projected surface; (h) calculating changes in the projected surface; and (i) calculating distinct structural signatures from the changes in the projected surfaces.

The computer usable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be understood that the foregoing description is of the preferred embodiments, and is, therefore, merely representative of the article and methods of manufacturing the same. It can be appreciated that many variations and modifications of the different embodiments in light of the above teachings will be readily apparent to those skilled in the art. Accordingly, the exemplary embodiments, as well as alternative embodiments, may be made without departing from the spirit and scope of the articles and methods as set forth in the attached claims.

What is claimed is:

1. A method for classification of vehicles comprising:
   (a) calibrating a transformation angle between a camera image and a road surface;
   (b) detecting moving objects on the road surface in the camera image;
   (c) establishing a vertical axis of symmetry for each of the moving objects;
   (d) detecting dominant horizontal edges intersecting with the vertical axis of symmetry for each of the moving objects;
   (e) tracking the dominant horizontal edges for a plurality of consecutive video frames;
   (f) projecting each of the dominant horizontal edges onto a ground plane;
   (g) treating each pair of adjacent projected edges as a projected surface;
   (h) calculating changes in the projected surface; and
   (i) calculating distinct structural signatures from the changes in the projected surfaces.

2. The method of claim 1, further comprising:
   classifying the distinct structural signatures in a class based on the distinct structural signatures and wherein the moving object is a motor vehicle and the class includes one of the following: sedan, pickup, minivan and sport utility vehicle (SUV).

3. The method of claim 2, comprising:
   separating asymmetric parts of the moving objects and classifying them as non-vehicles, and after separating asymmetric parts of the moving objects and classifying them as non-vehicles, projecting a lower edge of the blob onto the road surface using the transformation in classification step (a), and wherein the projected size is a width of the vehicle.

4. The method of claim 1, further comprising after treating each pair of adjacent projected edges as a projected surface, calculating a speed of a vehicle using a location of a lowest projected surface at at least two different times.

5. The method of claim 2, further comprising classifying passenger vehicles on a road surface.

6. The method of claim 2, further comprising allocating parking garage and/or parking lot spaces based on a vehicle classification.

7. The method of claim 2, further comprising calculating vehicle speed for law enforcement.

8. The method of claim 2, further comprising ensuring limited and/or controlled access to vehicles for security related applications.

9. A system for classification of vehicles comprising:
   a camera for capturing images of at least one moving object; and
   a computer processing unit, which performs the following steps:
   (a) calibrating a transformation angle between a camera image and a road surface;
   (b) detecting moving objects on the road surface in the camera image;
   (c) establishing a vertical axis of symmetry for each of the moving objects;
   (d) detecting dominant horizontal edges intersecting with the vertical axis of symmetry for each of the moving objects;
   (e) tracking the dominant horizontal edges for a plurality of consecutive video frames;
   (f) projecting each of the dominant horizontal edges onto a ground plane;
   (g) treating each pair of adjacent projected edges as a projected surface;
   (h) calculating changes in the projected surface; and
   (i) calculating distinct structural signatures from the changes in the projected surfaces.

10. The system of claim 9, wherein the computer processing unit further comprises a memory arrangement, a processing unit and an optional display unit for displaying data and/or classification of the distinct structures in the class.

11. The system of claim 9, wherein the camera captures video images.

12. The system of claim 9, further comprising classifying the distinct structural signatures in a class based on the distinct structural signatures.

13. The system of claim 12, further comprising separating asymmetric parts of the moving objects and classifying them as non-vehicles.

14. The system of claim 13, further comprising after separating asymmetric parts of the moving objects and classifying them as non-vehicles, projecting a lower edge of the blob onto the road surface using the transformation in classification step (a).

15. A computer program product comprising a non-transitory computer usable medium having a computer readable code embodied therein for classification of passenger vehicles and measuring their properties from a rear view video frame, the computer readable program code is configured to execute a process, which includes the steps of:
    (a) calibrating a transformation angle between a camera image and a road surface;
    (b) detecting moving objects on the road surface in the camera image;
    (c) establishing a vertical axis of symmetry for each of the moving objects;
    (d) detecting dominant horizontal edges intersecting with the vertical axis of symmetry for each of the moving objects;
    (e) tracking the dominant horizontal edges for a plurality of consecutive video frames;
    (f) projecting each of the dominant horizontal edges onto a ground plane;
    (g) treating each pair of adjacent projected edges as a projected surface;
    (h) calculating changes in the projected surface; and
    (i) calculating distinct structural signatures from the changes in the projected surfaces.

16. The product of claim 15, further comprising classifying the distinct structural signatures in a class based on the distinct structural signatures.

17. The product of claim 16, wherein the moving object is a motor vehicle and the class includes one of the following sedan, pickup, minivan and sport utility vehicle (SUV).

18. The product of claim 17, further comprising separating asymmetric parts of the moving objects and classifying them as non-vehicles.

19. The product of claim 18, further comprising after separating asymmetric parts of the moving objects and classifying them as non-vehicles, projecting a lower edge of the blob onto the road surface using the transformation in classification step (a).

* * * * *